(12) United States Patent
Fink

(10) Patent No.: US 9,933,103 B1
(45) Date of Patent: Apr. 3, 2018

(54) APPARATUS AND METHOD FOR SEALING A LEAK FROM A TUBULAR MEMBER

(71) Applicant: TECHNOFINK LLC, Spring, TX (US)

(72) Inventor: Thomas Georg Fink, Spring, TX (US)

(73) Assignee: TECHNOFINK LLC, Spring, TX (US)

( * ) Notice: Subject to any disclaimer, the term of this patent is extended or adjusted under 35 U.S.C. 154(b) by 0 days.

(21) Appl. No.: 15/278,721

(22) Filed: Sep. 28, 2016

(51) Int. Cl.
*F16L 55/16* (2006.01)
*F16L 55/162* (2006.01)
*F16L 55/168* (2006.01)
*F16L 55/18* (2006.01)

(52) U.S. Cl.
CPC ......... *F16L 55/162* (2013.01); *F16L 55/1686* (2013.01); *F16L 55/18* (2013.01)

(58) Field of Classification Search
CPC ... B01J 19/0073; F16B 43/001; F16L 55/168; F16L 55/17; F16L 55/172
USPC ...................................................... 138/99, 97
See application file for complete search history.

(56) References Cited

U.S. PATENT DOCUMENTS

| | | | |
|---|---|---|---|
| 2,069,722 A | 2/1936 | Merrill | |
| 2,478,684 A | 8/1949 | Brooks | |
| 2,905,206 A | 9/1959 | Creighton | |
| 2,999,515 A | 9/1961 | Watson | |
| 3,840,053 A | 10/1974 | Sluga | |
| 4,078,697 A * | 3/1978 | Schlosberg | B01J 19/0073 220/200 |
| 4,497,418 A * | 2/1985 | Nunlist | B23P 6/04 138/97 |
| 4,568,091 A | 2/1986 | Harrison | |
| 4,756,338 A | 7/1988 | Guyatt et al. | |
| 5,247,967 A * | 9/1993 | Bourque | F16L 55/16 138/97 |
| 5,706,862 A * | 1/1998 | Meinerding, Sr. | F16L 33/02 138/98 |
| 5,924,257 A * | 7/1999 | Mussler | B23P 6/04 29/402.15 |
| 5,971,030 A | 10/1999 | Maimets | |
| 6,138,718 A | 10/2000 | Maimets | |
| 7,370,676 B2 | 5/2008 | D'Auria et al. | |
| 7,624,760 B2 * | 12/2009 | Monk | F16L 55/168 138/97 |
| 8,141,592 B2 | 3/2012 | Rice | |
| 2011/0241342 A1 | 10/2011 | Skellern et al. | |

* cited by examiner

*Primary Examiner* — Patrick F Brinson
(74) *Attorney, Agent, or Firm* — Egbert Law Offices, PLLC

(57) ABSTRACT

An apparatus for sealing a leak from a tubular member has a channel member with at least one open end, a sealing member positioned in an interior of the channel member and having a channel extending therethrough, and a compression assembly having a portion extending through the channel of the sealing member. The compression assembly also has a rotatable element extending outwardly of the channel of the sealing member. The rotatable element is rotatable so as to compress or deform the sealing material within the interior of the channel member so as to seal the leak. A tape material is wrapped over the channel member so as to fix a position of the channel member over the leak.

18 Claims, 4 Drawing Sheets

APPARATUS AND METHOD FOR SEALING A LEAK FROM A TUBULAR MEMBER

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to methods and apparatus for sealing leaks of tubular members, such as pipes. More particularly, the present invention relates to apparatus and methods for sealing a leak from a tubular member in which a fluid is continuously flowing outwardly of the leak during the sealing. More particularly, the present invention relates to apparatus and method for sealing leaks from tubular members while a fluid continues to flow through the tubular member and without the need to stop the fluid flow through the tubular member.

2. Description of Related Art Including Information Disclosed Under 37 CFR 1.97 and 37 CFR 1.98

Piping is omnipresent in today's society. Piping is found in a wide range of residential, commercial, and industrial applications. For example, piping may be employed in utility distribution, manufacturing processes, chemical/petrochemical transport, energy transmission, plumbing, heating and cooling, sewage systems, as well as in the recovery of spent chemicals/compounds, such as discharges of exhausted chemicals, contaminated water, and so forth. In operation, piping within facilities and over longer distances, may serve to collect, distribute, and transport water, steam, chemicals, petrochemicals, crude oil, natural gas, and a variety of other liquids, gases, and components.

Piping systems, such as pipelines, may convey utilities, energy, and chemical/petrochemical components to industrial patrons, manufacturing sites, chemical/refining facilities, commercial entities, public institutions, consumers, and so on. Undeniably, pipelines (e.g., transmission pipelines) have played a beneficial role in improving productivity in delivery of resources. Indeed, world economies depend on the capability of pipelines to transport feedstocks and products to a diverse range of customers and end-users.

Peak construction of pipelines (e.g., gas and liquid petroleum pipelines) occurred 30-40 years ago, with a majority of these pipelines, including many constructed prior to World War II, still in service. As a result of their age, maintaining the integrity of the aging pipeline infrastructures is costly. Annual costs attributable to mitigating pipeline corrosion and other pipeline failures, potential failures, and anomalies, are in the billions of dollars. Economic considerations of pipeline repair may include labor, material, equipment requirements, available capital, economic return, repair life, pipeline downtime, and so forth. As expected, the economics of pipeline repair can have a significant impact on pipeline productivity.

Pipe failures and damage may be caused by mechanical harm, corrosion, erosion, damaged coatings, failing insulation, adverse operating conditions, weather, and so on. Internal erosion, for example, may occur due to the flow of the contents through the pipeline. Such erosion may be exacerbated by centrifugal forces associated with changes in the direction of the flow path. In regard to corrosion, the external surface of piping may be exposed to corrosive soil or above-ground corrosive environments, and the internal surface of piping may be exposed to corrosive contents. Significantly, erosion, corrosion, and other damage may reduce the wall thickness of the pipe and thus reduce the pressure rating or pressure-holding capacity of the pipe or pipeline. Accordingly, the operations and maintenance personnel of pipeline companies (e.g., gas transmission companies) may determine if a failure or an area of potential failure discovered in a pipeline should be repaired, if a section of the pipe should be replaced, or if the pipeline should be abandoned.

In evaluating repair decisions, pipeline operators and service providers typically consider the pipeline downtime, pipe specifications, the pipe area to be repaired, buried conditions, the above-ground environment, the contents of the piping or pipeline, pipeline operating conditions, and the like. Of course, the pipeline operators and service providers should accommodate regulatory constraints, appropriate industry standards, manufacturer recommendations, and so on. Moreover, the maintenance approach ultimately selected may involve repair of a leak or other failure, or the preemptive repair of a pipe area prior to failure (e.g., leak, rupture, etc.) of the pipeline. Finally, in an effort to maintain pipeline integrity while being mindful of costs, the environment, regulatory constraints, and so on, the pipeline operators and service providers typically assess the maintenance, replacement, and repair of piping/pipelines based on available engineering alternatives and the economic impact of those alternatives. In the case of a repair, several technologies, application techniques, and materials are available.

Common repair technologies employ metal sleeves that are disposed about a section of a pipe to reinforce the pipe. Both welded sleeves and non-welded (mechanical) sleeves may be installed over varying lengths and diameters of piping to repair pipe leaks and other failures. Also, sleeves may preemptively repair potential pipe failures, reinforce pipe areas of internal and external corrosion, upgrade the pressure rating of the piping, and so forth. In general, established sleeve techniques, whether utilizing sleeves welded in place around the pipe, or employing sleeves mechanically secured to the pipe without welding, offer the advantage of being familiar repair approaches in the industry. In the repair of pipelines, operators, engineers, and craftsman are accustomed to working with welded fittings for welded sleeves, as well as with mechanical devices and clamps for non-welded sleeves. Unfortunately, the training of personnel in the suitable mechanical and welding techniques is extensive for proper installation of the sleeves.

Further, non-welded and welded sleeve repair of pipelines may result in embrittlement and residual stresses at the point of repair on the pipeline.

For welded sleeves, the sleeves may be welded around the pipe to be repaired, encasing the pipe segment to be reinforced. The mating edges of the sleeve halves may be welded to each other, and the ends of the erected sleeve welded to the pipe, to seal and secure the welded sleeve to the pipe. It should be emphasized that a variety of welding configurations other than the generic approach described above may be employed in installing the welded sleeve. Costs associated with welding repairs, including welded-sleeve repairs (e.g., on high-pressure transmission pipelines), may be attributed to the use of highly-skilled welders, the shutdown and deinventory of the pipeline, and the shutdown of associated manufacturing facilities, chemical/petrochemical processes, and so on.

Generally, it is desirable from an operating cost standpoint to repair piping while the pipeline remains in service, thus eliminating costly downtime. Repair techniques that avoid welding or cutting of the pipe, for example, may make it feasible to maintain the pipeline in service during the repair and thus avoid the costs associated with pipeline downtime. It should be emphasized that a shutdown of a pipeline for repair can potentially force the shutdown of upstream and downstream facilities, resulting in lost production, lost sales, shutdown and startup costs, and so forth.

In the past, various patents and patent application publications have issued with respect to apparatus and method for the repair of leaks from tubular members. In particular, U.S. Pat. No. 2,069,722, issued on Feb. 27, 1936 to P. D. Merrill, describes a pipe leak sealing gasket adapted to overlie the leaking area of a pipe and to be press there against by a pipe encircling clamp. This gasket comprises a rubber body of a preformed arcuate shape having an interface substantially conforming to the curvature of the outer face of the pipe and an outer curved face eccentric of the interface substantially conforming to the curvature of the interface of the clamp whereby the thickness of the gasket reduces from its center to its sides. The gasket effectively seals the leaking area upon application of pressure thereto sufficient to force the interface thereof into full face engagement with the pipe without substantial deforming thereof.

U.S. Pat. No. 2,478,684, issued on Aug. 9, 1949 to W. W. Brooks, shows a method for repairing a leak in a pipe carrying fluid under high pressure. This method includes cutting the pipe across the point of the leak to form two sections with abutting ends, slipping on each section a gland and then a gasket, slipping on one of the sections a sleeve having a central portion snugly fitting the pipe and having at each end a longitudinally projecting offset portion which, together with the pipe, forms an annular space at either end of the sleeve. The two sections of the pipe are then aligned. This sleeve is moved to a position covering the abutting ends of the pipe. Each gasket is forced into its respective annular recess with the corresponding gland. Pressure is applied to the ends of the glands to compress the gasket and to form a fluid-type joint around the point of juncture of the pipe sections. The sleeve is then welded to the glands and the glands are then welded to the pipe sections.

U.S. Pat. No. 2,905,206, issued on Sep. 22, 1959 to A. M. Creighton, shows a patch and repair for leaking holes in pipelines. This patch is of a sheet material of sufficient strength to withstand normal fluid pressures in the fluid container. A gasket is used to cover the leak. The patch member rests on the gasket and is substantially coextensive therewith. The gasket has a substantial thickness whereby it supports the margins of the patch member in spatial relationship with the adjacent outer surface of the container. A resin is then applied to it as sealed margins of the patch member.

U.S. Pat. No. 2,999,515, issued on Sep. 12, 1961 to J. J. Watson, teaches a pipeline leak clamp. This pipe repair device comprises a longitudinally split sleeve adapted to snugly embrace a pipe and reinforce the wall of the pipe, a means for securing the sections of the sleeve together with each section in firm abutment with a pipe therebetween, and a leak-chamber open at one end carried by the sleeve. The chamber is closed except for the end used to confine fluids when the end of the chamber is sealed to the pipe over the leak. A continuous wall is carried by the chamber and surrounds the wall thereof at its open end to provide a seal-receiving channel with the open end of the wall terminating approximately in the cylindrical surface. A seal is received in the channel. A compression device accessible from the exterior device urges the seal into firm engagement with the pipe and the side walls of the channel so as to provide a seal between the pipe and the open end of the chamber.

U.S. Pat. No. 3,840,053, issued on Oct. 8, 1974 to W. J. Sluga, provides a clamp for the repair of pipe leaks in low-pressure piping. An annular gasket seal is supported against the internal pipe surface axially spanning the area of the leak. An annular backing ring extends widthwise as well as radially along the sidewalls of the gasket axially confining the gasket in a predetermined circumferential compression against the pipe wall.

U.S. Pat. No. 4,568,091, issued on Feb. 4, 1986 to G. W. Harrison, discloses a sealing member including a seal retainer sleeve provided in segments and two spaced-apart grooves to defined the inner wall of the sleeve. The sleeve is adapted to be fitted around the outside of a cylindrical surface on each side of an opening. An elastomeric fluid pressure seal segment is mounted within each groove in the sleeve to provide a fluid-tight seal within the space confined between the grooves. The bottom of each of the grooves is dovetailed to retain the corresponding mounting beads of the seal.

U.S. Pat. No. 4,756,338, issued on Jul. 12, 1988 to Guyatt et al., provides a pipe repair assembly to repair a pipe when fluids therein are under high pressure. A cylinder, provided with in two longitudinal sections, is secured around the pipe and over the leaking area. One section has an opened central valve and an inner sealing gasket with a hole matching the entry of the opened central valve. During the positioning the pipe repair assembly, a half-cylindrical sleeve is provided for protective initial interior placement over the sealing gasket. The half of the sleeve fits into an end notch on one longitudinal section to position the hole with a partial length central longitudinal opening in horizontal alignment with the opening of the valve. This pipe repair assembly is moved sideways along the pipe and over the leak so as to place the open valve over the leak. The exiting fluid is then directed out of the valve.

U.S. Pat. No. 5,971,030, issued on Oct. 26, 1999 to L. Maimets, discloses an apparatus and method for repairing pressure pipes. In particular, a bubble gasket is used to prevent the creation of a gap between a repair sleeve and the inside of a host pipe. During rebounding and locking of the edges of the repair sleeve, the bubbles maintain a force against the sealant as the sealant cures.

U.S. Pat. No. 6,138,718, issued on Oct. 31, 2000 L. Maimets, teaches an apparatus and method for repairing pressure pipes. The conduit repair apparatus includes a sleeve having an outer surface, an outwardly flared end portion, a pair of longitudinal edges, and a locking structure to lock the sleeve into a tubular configuration within an inner surface of the host pipe to be repaired. A resilient, compressible gasket is adapted to be applied over the outer surface of the sleeve. A sealing membrane is adapted to be applied over the outer surface of the resilient, compressible gasket. A curable sealant is adapted to be applied over the sealing membrane. The sealant is pressed by the gasket between the outer surface of the sleeve and the inner surface of the host gasket while the sealant is cured.

U.S. Pat. No. 7,370,676, issued on May 13, 2008 to D'Auria et al., provides a sleeve with an insert for repairing high-pressure fluid pipes. The sleeve includes a rigid or flexible shell which forms a mold that surrounds at least one defective area of a pipe. A liquid-state polymerizable material is injected into the mold so as to polymerize and seal the defective area. The sleeve further includes an insert which is made up of several coils of a filiform element which is wound around a helix around the defective area of the pipe before the polymerizable material is injected or infused.

U.S. Pat. No. 8,141,592, issued on Mar. 27, 2012 to P. L. Rice, shows a system and method for repairing a pipe, including securing a reinforcing material to the surface of the pipe. A polymeric material is placed on top of the reinforcing material. The polymeric material substantially saturates the reinforcing material and cures to form a reinforced polymeric composite which may increase or restore the pressure rating or operating pressure capacity of the pipe.

U.S. Patent Publication No. 2011/0241342, published on Oct. 6, 2011 to Skellern et al., describes a pipe repair clamp with a soft-pressurizing sleeve. The interlocking pipe clamp and internal circumferential self-pressurizing seal is installed in a recessed seal groove within the clamp housing. It embodies a unidirectional fluid orifice leading to an internal pressure-responsive chamber whereby trapped fluids inside the chamber expand outwardly under pressure to force the external sealing surface of several pliable, multi-combed and conjoined fingers to form a series of redundant seals against the leaking pipe with an increasingly greater force to prevent the escape of fluids from the pipe and prevent seal dislodgment from the pipe repair clamp.

It is an object of the present invention to provide an apparatus and method for sealing a leak from a tubular member that effectively seals high-pressure leaks of tubular members.

It is another object of the present invention provide an apparatus and method for sealing a leak from a tubular member which allows the seal to be established without interrupting the flow of fluid through the pipe.

It is another object of the present invention to provide an apparatus and method for sealing a leak from a tubular member in which the seal can be created through the use of manipulation of a single tool.

It is still another object of the present invention to provide an apparatus and method for sealing a leak from a tubular member which is inexpensive, easy to use, and easy to manufacture.

It is still a further object of the present invention to provide an apparatus and method for sealing a leak from a tubular member in which the leak can be sealed without special training, knowledge or experience by the person carrying out the repair.

It is still a further object of the present invention provide an apparatus and method for sealing a leak from a tubular member which enhances the safety of the person carrying out the repair.

These and other objects and advantages of the present invention will become apparent from a reading of the attached specification and appended claims.

BRIEF SUMMARY OF THE INVENTION

The present invention is an apparatus for sealing a leak from a tubular member that comprises a channel member having at least one open end, a sealing member positioned in the interior of the channel member and in which the sealing member has a channel extending therethrough, and a compression assembly having a portion extending through the channel of the sealing member. The channel of the sealing member opens at opposite ends of the sealing member. The sealing member can be formed of a compressible or deformable material. The compression assembly has a rotatable element extending outwardly of the channel of the sealing member. The rotatable element is rotatable so as to compress or deform the sealing member within the interior of the channel member so as to seal the leak.

In the present invention, a tape material can be wrapped around the channel member so as to fix a position of the channel member over the leak on the tubular member.

The channel member includes a pair of side walls in spaced relation to each other and a back wall extending between the pair of sidewall so as to define the interior of the channel member. The channel member has a pair of open ends at opposite ends thereof.

The sealing member can be formed of a rubber or elastomeric material. The sealing member extend substantially within the interior of the channel.

The compression assembly includes a threaded member extending through the channel of the sealing member so as to have at least one end extending outwardly of an end of the sealing member. The rotatable element is threadedly mounted on the threaded member at the end extending outwardly of the sealing member. The threaded member has threads extending in one direction adjacent one end of the threaded member and has threads extending in an opposite direction adjacent the opposite end of the threaded member. A first bearing member is threadedly affixed adjacent to one of the ends of the threaded member. The first bearing member bears against one end of the sealing member. The first bearing member has a diameter greater than a diameter of the channel of the sealing member. A second bearing member is slidably positioned on the threaded member adjacent to an opposite end of the threaded member. The second bearing member bears against an opposite end of the sealing member. The second bearing member also has a diameter greater than the diameter of the channel of the sealing member. The rotatable element bears against a surface of the second bearing member opposite the opposite end of the sealing member. The first bearing member is positioned within the interior of the channel member.

The present invention is also a method of repairing a leak in a tubular member. The method comprises the steps of: (1) applying a channel member over the leak such that the direction of flow of fluid through the leak is diverted outwardly of at least one end of the channel member; (2) positioning the applied channel member onto the tubular member such that the channel member is mounted over the leak; (3) inserting a sealing member into an interior of the channel member such that the sealing member overlies the leak; and (4) compressing the sealing member so as to deform the sealing member such that the sealing member blocks the leak.

In this method, a threaded member extends through a channel of the sealing member. The threaded member has a rotatable element threadedly mounted adjacent one end of the sealing member. As such, the step of compressing includes rotating the rotatable element so as to compress opposite ends of the sealing member. The rotatable element is rotated so as to draw a first bearing member along the threaded member toward the rotatable element so as to compress the sealing element. The wrench is applied on to the rotatable element. The wrench has a handle extending outwardly beyond the channel member. The wrench is moved so as to compress the sealing member. A tape material is applied around the tubular member and over the channel member so as to fix the channel member and the sealing member over the leak.

This foregoing Section is intended to describe, with particularity, the preferred embodiments of the present invention. It is understood that modifications to these preferred embodiment can be made within the scope of the present claims. As such, this Section should not to be construed, in any way, as limiting of the broad scope of the present invention. The present invention should only be limited by the following claims and their legal equivalents.

BRIEF DESCRIPTION OF THE SEVERAL
VIEWS OF THE DRAWINGS

DETAILED DESCRIPTION OF THE
INVENTION

Figure 1:
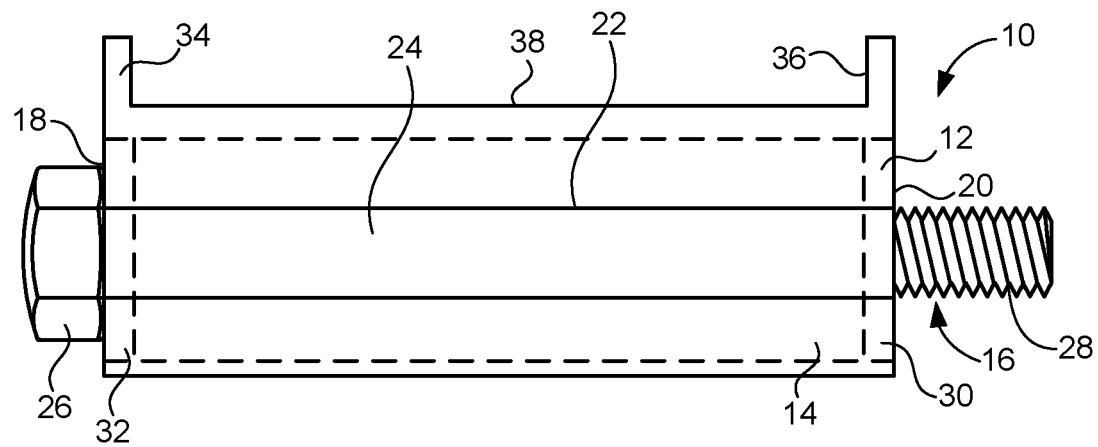
FIG. 1 is a side elevational view of the pipe repair apparatus of the present invention.

Referring to FIG. 1, there is shown the pipe repair apparatus 10 of the present invention. The pipe repair apparatus 10 includes a channel member 12, a sealing member 14 positioned in the interior of the channel member, and a compression assembly 16 cooperative with the sealing member 14. The channel member 12 as will be described hereinafter has a first open end 18 and a second open end 20. The sealing member 14 has a channel 22 extending therethrough. This channel 22 opens at opposite ends of the sealing member 14. The sealing member 14 can be formed of a compressible or deformable material. The compression assembly 16 has a portion 24 extending through the channel 22 of the sealing member. The compression assembly 16 includes a rotatable element 26 extending outwardly of the channel 22 of the sealing member 14. The rotatable element 26 is rotatable so as to compress or deform the sealing member 14 within the channel member 12 so as to seal the leak.

As can be seen in FIG. 1, the compression assembly 16 includes a threaded member 28 extending through the channel 22 of the sealing member 14 so as to have an end extending outwardly of an end of the sealing member 22. In particular, the threaded member has a portion extending outwardly of the end 20 of the channel member 12. The rotatable element 26 is threadedly mounted on the threaded member 28 adjacent to the end 18 of the channel member 12 and exterior of the channel 22 of the sealing member 14. As will be described hereinafter, the threaded member 28 has threads extending in one direction adjacent to one end of the threaded member 28 and has threads extending in an opposite direction adjacent an opposite end of the threaded member. A first bearing member 30 is threadedly affixed adjacent to one of the ends of the threaded member 28. The first bearing member 30 bears against one end of the sealing member 14. As can be seen, the first bearing member 30 has a diameter greater than a diameter of the channel 22 of the sealing member 14. A second bearing member 32 is positioned on the threaded member 28 adjacent to an opposite end of the threaded member. The second bearing member 32 bears against an opposite end of the sealing member 14. The second bearing member 32 also has a diameter greater than the diameter of the channel 22 of the sealing member 14. It can be seen that the rotatable element 26 bears against a surface of the second bearing member 32. The rotatable element 26 is a nut that is threadedly secured to the threaded member 28.

FIG. 1 shows that the channel member 12 has a pair of flanges 34 and 36 extending upwardly therefrom. Each of these flanges 34 and 36 is adjacent to the respective ends 18 and 20 of the channel member 12. The flanges 34 and 36 defined a region 38 at the top of the channel member 12 adapted to receive a tape material thereover.

Figure 2:
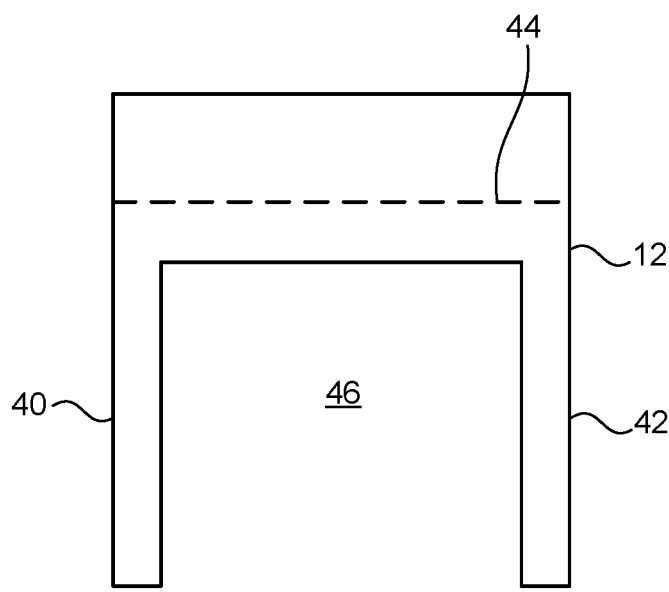
FIG. 2 is in end view of the channel member of the pipe repair apparatus of the present invention.

FIG. 2 shows an end view of the channel member 12 of the present invention. In particular, the channel member 12 includes sidewalls 40 and 42 that are arranged in spaced parallel relationship to each other. A back wall 44 extends between the pair of sidewalls 40 and 42 so as to define the interior 46 of the channel member 12. FIG. 2 shows that the ends of the channel member 12 are open.

Figure 3:
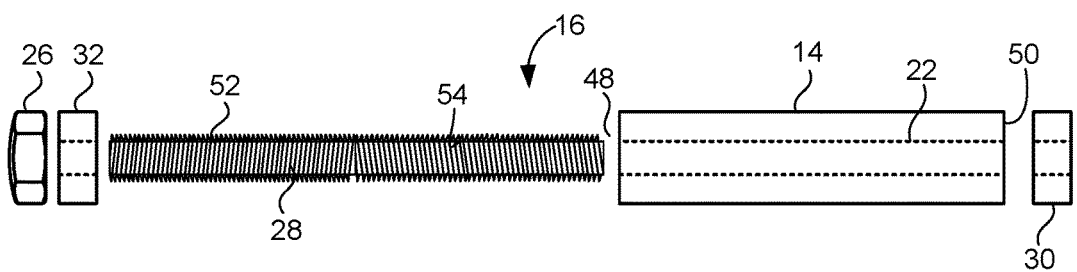
FIG. 3 is an exploded view of the compression assembly and the sealing element as used in the pipe repair apparatus of the present invention.
Figure 4:
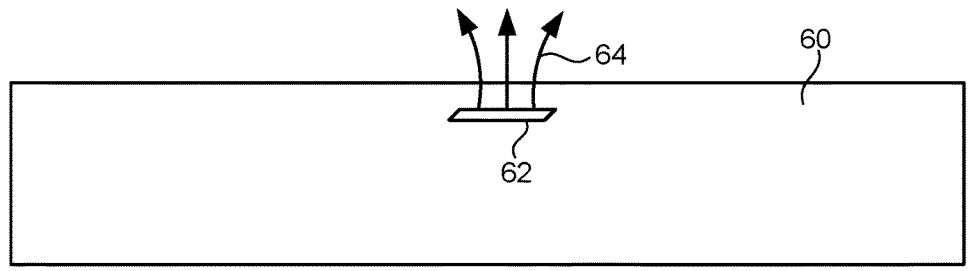
FIG. 4 is at it side elevational view showing a leak in a pipe.

FIG. 3 is an exploded view showing the sealing member 14 and the compression assembly 16. In particular, in FIG. 3, the sealing member 14 has a channel 22 extending longitudinally and centrally therethrough. The sealing member 14 has a first end 48 and a second end 50.

The compression assembly 16 includes the threaded member 28. The threaded member 28 has reverse threads thereon. In other words, there is a first set of threads 52 that extend in one direction and a second set of threads 54 that extend in an opposite direction. The rotatable element 26 is in the form of a nut that can be secured on to the first set of threads 52. The first bearing member 50 will be positioned adjacent to the end 50 of the sealing member 14. The first bearing member 30 will be received by the second set of threads 54. The second bearing member 32 is located adjacent to the interface of the rotatable element 26. The second threaded member 32 can be slidably positioned on the first set of threads 52 of the threaded member 28 so as to ultimately bear against the and 48 of the sealing member 14.

As will be described hereinafter, the reverse threads associated with the threaded member 28 create a very unique configuration for the present invention. In other words, the rotation of the rotatable element 26 on the first set of threads 52 will cause the first bearing member 30 to be drawn inwardly against the and 50 of the sealing member 14. Simultaneously, this rotation of the rotatable element 26 on the first set of threads 52 will urge the second bearing member 32, in the form of a washer, to be urged toward the end 48 of the sealing element 14. As such, with only a single rotation of the rotatable element 26, both the first bearing member 30 and the second bearing member 32 will move toward each other so as to compress and deform the sealing element 14 within the interior 46 of the channel member 12.

FIGS. 4-9 illustrates the steps in the method of the present invention. In particular, in FIG. 4, it can be seen that there is a tubular member 60 that has a leak 62 through the wall of the tubular member 60. A fluid 64 is illustrated as gushing or flowing through the leak 62. Within the concept of the present invention, the tubular member 60 can be in the nature of a high-pressure pipe. As such, the fluid 64 will be flowing through the leak 62 with very high pressures. Before the present invention, it was very difficult to seal such a leak without shutting down the process from which the fluid 64 flows through the pipe 60. The present invention provides a very unique approach whereby the leak 62 can be effectively sealed without shutting down the fluid flow process.

Figure 5:
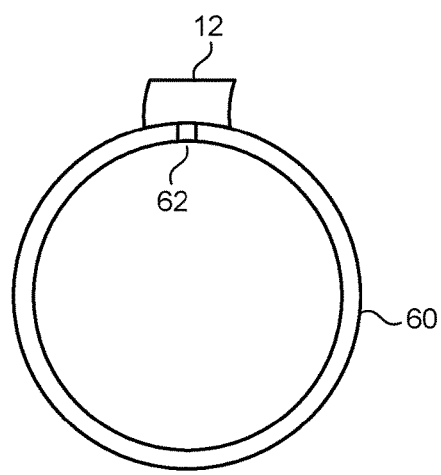
FIG. 5 is an end view showing the placement of the channel member over the leak in the pipe.
Figure 6:
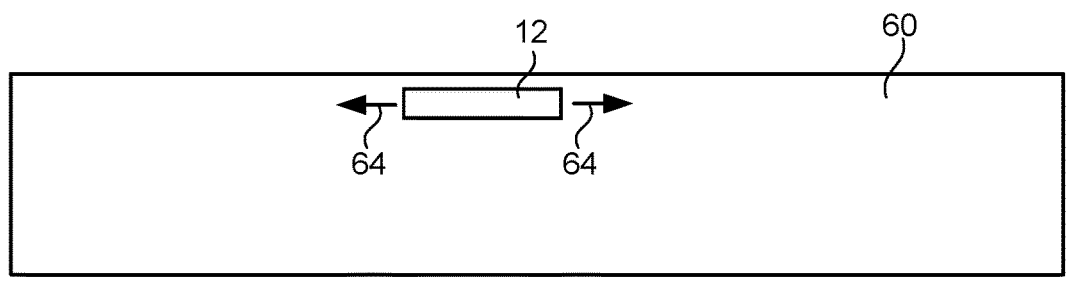
FIG. 6 illustrates the diversion of fluid flow by the channel member of the present invention.

FIG. 5 shows a first step in the process of the present invention. As can be seen, the channel member 12 is positioned over the leak 62 of the pipe 60. With reference to FIG. 2, it can be seen that the bottom ends of the sides 40 and 42 of the channel member 12 will be placed against the exterior of the pipe 60 on opposite sides of the leak 62. As such, the fluid flowing through the leak 62 will pass into the interior 46 of the channel member 12. Importantly, FIG. 6 shows how the use of the channel member 12 serves to divert the fluid flow 64. When the channel member 12 is placed over the leak 62, the fluid flow is diverted outwardly of the open ends of the channel member 12. As such, the fluid will flow from a direction generally transverse to the longitudinal axis of the pipe 60 to opposite directions that are each parallel to the longitudinal axis of the pipe. In practice, it was found that this application of the channel member 12 onto the exterior of the pipe 60 can be carried out with very little force. In particular, the force associated with the fluid flow 64 is diverted outwardly in two directions opposite to one another. As such, the back wall 44 of the channel member 12 can actually block any contact between the fluid flow 64 and the hand or tool used to place the channel member 12 over the leak 62.

Figure 7:
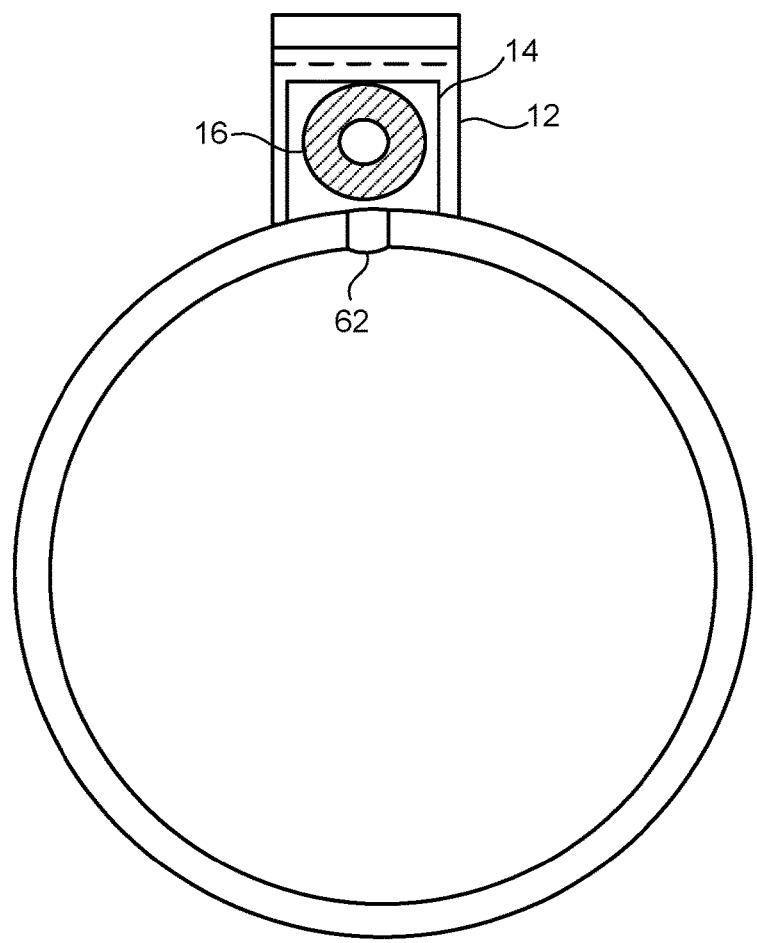
FIG. 7 shows the installation of the sealing member and compression assembly over the leak of the pipe.

FIG. 7 shows that the channel member 12 has been placed over the leak 62. The sealing member 14, along with the compression assembly 16, can now be inserted into one of the open ends of the channel member 12. As such, the sealing member 14 and the compression assembly 16 will be received within the interior 46 of the channel member 12. This installation can be carried out prior to placing the channel member 12 over the leak 62 or can be carried out subsequent to the placement of the channel member 12 over the leak 62. The force of flow through the leak 62 will strongly urge the sealing member 14 toward the back wall 44 of the channel member 12 so as to generally fix a position of the sealing member 12. Ultimately, the rotatable element 26 associated with the compression assembly 16 will extend outwardly of the end of the channel member 12.

Figure 8:
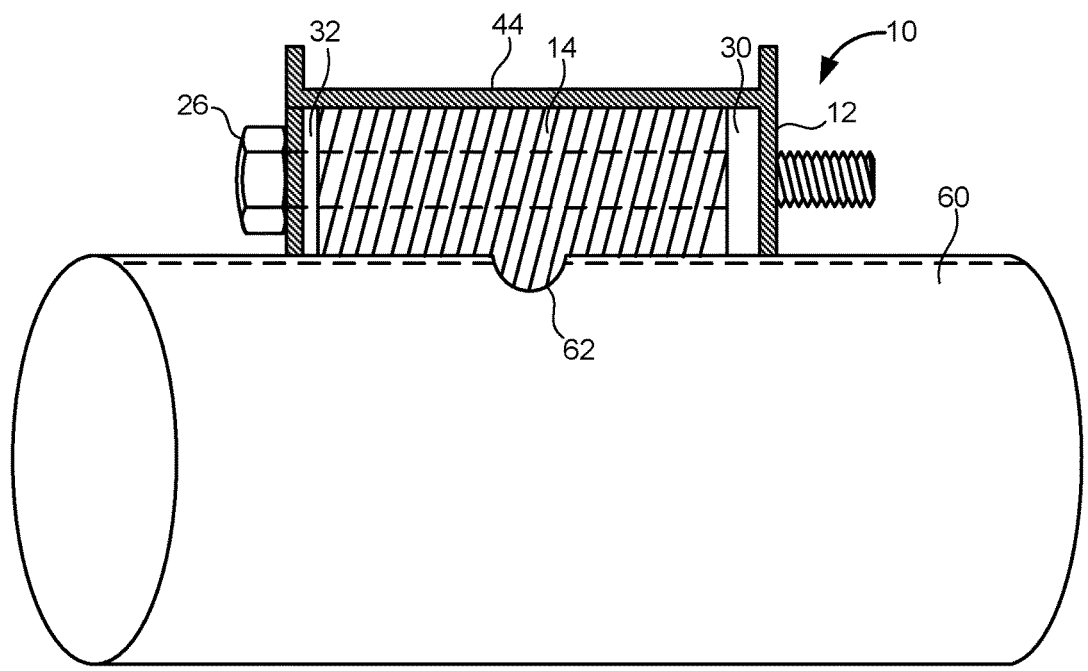
FIG. 8 is a side elevational view showing the sealing of the leak in the pipe by the pipe repair apparatus of the present invention.

FIG. 8 illustrates how the pipe repair apparatus 10 can be manipulated so as to effectively seal the leak 62. FIG. 8 shows that the rotatable element 26 has been rotated so as to cause the first bearing member 30 and the second bearing member 32 to move inwardly against the respective ends of the sealing member 14 so as to strongly compress the sealing member 14 within the interior of the channel member 12. The deformation and compression of the sealing member 14 will urge a portion of the sealing member 14 into the leak 62. Further rotation of the rotatable element 26 will further seal and block fluid from flowing out of the leak 62. Importantly, this can be carried out by simply placing pressure on to the back wall 44 of the channel member 22. A wrench can be used so as to grasp the rotatable element 26. Since the wrench has a handle that extends outwardly away from the rotatable element 26, the wrench can be manipulated and moved by the hand of a worker without close contact with the fluid flow 64. This can be carried out very quickly and easily by relatively inexperienced worker.

Figure 9:
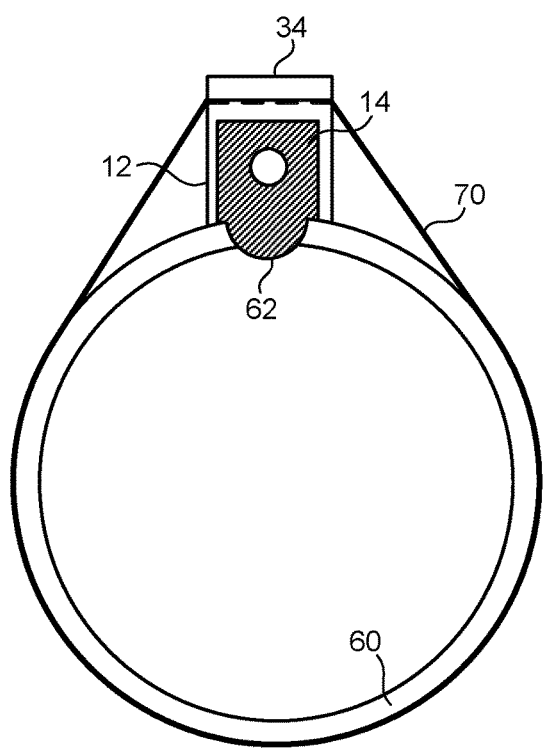
FIG. 9 is an end view showing the sealing of the leak of the pipe with the pipe repair apparatus of the present invention.

FIG. 9 shows a final step in the process of the present invention. As can be seen in FIG. 9, the sealing element 14 has been compressed so as to extend into the opening of the leak 62. Once this is established, a tape material 70 can be wrapped around the exterior of the pipe 60 and also wrapped around the channel member 12. In particular, the tape will extend around the area and 38 between the flanges 34 and 36 of the channel member 12. This tape material can be a fiberglass tape impregnated with water-activated resin. This tape material 70 can be in the nature of "TAPEGLASS" manufactured and sold by Technofink. A variety of other types of tape material can also be used so as to fixedly maintain the channel member 12, along with its sealing material 14, in the position over the leak 62.

As a result of this repair, the leak 62 on the pipe 60 has been sealed. This sealing process can be carried out as the process fluid continues to flow through the pipe 60.

The foregoing disclosure and description of the invention is illustrative and explanatory thereof. Various changes in the details of the illustrated construction, or in the steps of the described method, can be made within the scope of the present claims without departing from the true spirit of the invention. The present invention should only be limited by the following claims and their legal equivalents.

I claim:

1. An apparatus for sealing a leak from a tubular member, the apparatus comprising:
   a channel member having at least one open end;
   a sealing member positioned in said interior of said channel member, said sealing member having a channel extending therethrough, said channel opening at opposite ends of said sealing member, said sealing member being formed of a compressible or deformable material;
   a compression assembly having a portion extending through said channel of said sealing member, said compression assembly having a rotatable element extending outwardly of said channel of said sealing member, said rotatable element being rotatable so as to compress or deform said sealing member within said interior of said channel member so as to seal the leak; and
   a tape material wrapped over said channel member so as to fix a position of said channel member over the leak on the tubular member.

2. The apparatus of claim 1, said channel member comprising:
   a pair of side walls in spaced relation to each other; and
   a back wall extending between said pair of sidewalls so as to define said interior of said channel member.

3. The apparatus of claim 1, said channel member having a pair of open ends at opposite ends thereof.

4. The apparatus of claim 1, said sealing member being formed of a rubber or an elastomeric material.

5. The apparatus of claim 1, said compression assembly comprising:
 a threaded member extending through said channel of said sealing member so as to have at least one end extending outwardly of an end of said sealing member, said rotatable element being threadedly mounted on said threaded member at the end extending outwardly of said sealing member.

6. The apparatus of claim 5, said threaded member having threads extending in one direction adjacent one end of said threaded member and having threads extending in an opposite direction adjacent an opposite end of said threaded member.

7. The apparatus of claim 5, further comprising:
 a first bearing member threadedly affixed adjacent to one of the ends of said threaded member, said first bearing member bearing against one end of said sealing member, said first bearing member having a diameter greater than a diameter of said channel of said sealing member.

8. The apparatus of claim 7, further comprising:
 a second bearing member positioned on said threaded member adjacent to an opposite end of said threaded member, said second bearing member bearing against an opposite end of said sealing member, said second bearing member having a diameter greater than a diameter of said channel of said sealing member.

9. The apparatus of claim 7, said rotatable element bearing against a surface of said second bearing member opposite said opposite on an opposite side of said second bearing member from said sealing member.

10. The apparatus of claim 7, said first bearing member having an exterior received within the interior of said channel member.

11. An apparatus comprising:
 a tubular member having a leak such that a fluid within said tubular member flows outwardly through the leak;
 a channel member positioned against said tubular member so as to extend over said leak, said channel member having at least one open end;
 a sealing member positioned in an interior of said channel member, said sealing member having a channel extending therethrough, said channel opening at opposite ends of said sealing member, said sealing member being formed of a compressible or deformable material;
 a compression assembly having a portion extending through said channel of said sealing member, said compression assembly having a rotatable element extending outwardly of said channel of said sealing member, said rotatable element being rotatable so as to compress or deform said sealing member within the interior of said channel member so as to seal the leak; and
 a tape material wrapped around said tubular member and over said channel member so as to fix a position of said channel member over said leak.

12. The apparatus of claim 11, said channel member comprising:
 a pair of side walls in spaced relation to each other; and
 a back wall extending between said pair of sidewalls so as to define the interior of said channel member, said channel member having a pair of open ends at opposite ends thereof.

13. The apparatus of claim 11, said compression assembly comprising:
 a threaded member extending through said channel of said sealing member so as to have at least one end extending outwardly of an end of said sealing member, said rotatable element threadedly mounted on said threaded member at the end extending outwardly of said sealing member, said threaded member having threads extending in one direction adjacent one end of said threaded member and having threads extending in an opposite direction adjacent an opposite end of said threaded member.

14. The apparatus of claim 11, further comprising:
 a first bearing member threadedly affixed adjacent one of the ends of said threaded member, said first bearing member bearing against one end of said sealing member, said first bearing member having a diameter greater than a diameter of said channel of said sealing member; and
 a second bearing member positioned on said threaded member adjacent to an opposite end of said threaded member, said second bearing member bearing against an opposite end of said sealing member, said second bearing member having a diameter greater than the diameter of said channel of said sealing member, said rotatable element bearing against a surface of said second bearing member opposite to said opposite end of said sealing member, said first bearing member being received within the interior of said channel member.

15. A method of repairing a leak on a tubular member, the method comprising:
 applying a channel member over the leak such that the direction of flow of a fluid through the leak is diverted outwardly of at least one end of said channel member;
 positioning the applied channel member on to the tubular member such that said channel member is maintained over the leak;
 inserting a sealing member into an interior of said channel member such that said sealing member overlies the leak;
 compressing said sealing member so as to deform said sealing member such that said sealing member blocks the leak; and
 applying a tape material around the tubular member and over said channel member so as to fix said channel member and said sealing member over the leak.

16. The method of claim 15, said sealing member having a channel extending therethrough, a threaded member extending through said channel of said sealing member, said threaded member having a rotatable element threadedly mounted adjacent one end of said sealing member, the step of compressing comprising:
 rotating said rotatable element so as to compress opposite ends of said sealing member.

17. The method of claim 16, said threaded member having threads extending in one direction adjacent one end of said threaded member and threads extending in an opposite direction adjacent an opposite end of said threaded member, said threaded member having a first bearing member bearing against an end of said sealing member opposite said rotatable element, the step of compressing comprising:
 rotating only said rotatable element so as to draw said first bearing member along said threaded member so as to compress said sealing element.

18. The method of claim 17, the step of compressing comprising:
 applying a wrench on to said rotatable element, said wrench having a handle extending outwardly beyond said channel member; and moving said wrench so as to rotate said rotatable element and to compress said sealing member.

* * * * *